United States Patent [19]
Golson

[11] Patent Number: 5,419,586
[45] Date of Patent: May 30, 1995

[54] BOUND CARTOGRAPHIC MATERIAL

[75] Inventor: J. Geoffrey Golson, Lake Bluff, Ill.

[73] Assignee: Rand McNally & Company, Slokie, Ill.

[21] Appl. No.: 168,045

[22] Filed: Dec. 15, 1993

[51] Int. Cl.6 .......................................... G09B 29/02
[52] U.S. Cl. ...................................... 283/34; 283/35; 283/64; 283/115; 281/15.1
[58] Field of Search ................ 283/34, 35, 117, 115, 283/63.1, 64; 281/15.1, 19.2, 51, 22, 27.1, 33

[56] References Cited

U.S. PATENT DOCUMENTS

| | | |
|---|---|---|
| 2,889,638 | 6/1959 | Anderson . |
| 4,673,197 | 6/1987 | Shtipelman et al. ............... 283/34 |
| 5,029,899 | 7/1991 | Schieppati et al. ............... 281/30 |
| 5,306,048 | 4/1994 | Park ................................ 283/35 |

FOREIGN PATENT DOCUMENTS

| | | | |
|---|---|---|---|
| 3242 | 8/1926 | Australia | 283/35 |
| 613092 | 8/1926 | France | 283/34 |
| 683701 | 3/1930 | France | 283/35 |
| 190968 | 11/1906 | Germany | 283/35 |

*Primary Examiner*—Frances Han
*Attorney, Agent, or Firm*—Laff, Whitesel, Conte & Saret, Ltd.

[57] ABSTRACT

A bound volume of cartographic material that includes a plurality of rectangular leaves of a first height and width, with each of the leaves having a top and a bottom edge and a first and second edge, and a cover. The cover includes a first panel and a second panel, with the first panel having a first and a second side edge. The first panel is bound by a metal binding mechanism along the first side edge, and the second panel is hingedly connected to the second side edge of the first panel. The second panel is proportioned to fold over the first panel and to fold out and lie adjacent the second side edge of the first panel. The second panel, when folded out, displays first, small scale cartographic indicia and key grid indicia, with the key grid indicia including multiple grid sections overlying the first cartographic indicia. Each of the leaves defines second, large scale cartographic indicia and bears a key grid indicium, with the cartographic indicia on an individual leaf corresponding to the cartographic indicia in one of the grid sections, and the key grid indicium on the individual leaf corresponding to the key grid indicia for one of the grid sections. The second panel and the leaves may be used in juxtaposition to view, coordinate, and compare the large scale and the small scale cartographic indicia in a side-by-side relationship.

13 Claims, 3 Drawing Sheets

5,419,586

BOUND CARTOGRAPHIC MATERIAL

FIELD OF THE INVENTION

This invention relates to cartographic material. More particularly, this invention relates to small and large scale cartographic material bound in a single volume.

BACKGROUND OF THE INVENTION

Integrating overall or key maps with detail maps in booklet form is well known in the cartographic industry. Key maps generally depict a large section of a particular area in small scale and typically include only necessary detail, such as, for example, major highways and waterways of the area. Key maps commonly appear on one page or complementary pages of the booklet. In contrast, detail maps provide a detailed representation in large scale of a portion of the area covered by the key map and generally include a key grid indicium which corresponds to key grid indicia on the key map. Detail maps are generally depicted on the remaining pages of the booklet.

Although integrated key and detail map booklets are useful in that maps for a specific area are consolidated into a single booklet and are more easily viewed in a restricted area, there are problems associated with their use. For example, detail maps cannot be viewed concurrently with key maps within the same booklet. This presents a problem since concurrent map viewing is critical for establishing the relationship between the details of the selected area and the other parts of the key map. Consequently, the motorist or other user must alternatively view the detail and the key maps in an effort to establish some type of relationship between the key and detail maps. Such alternate viewing is not only inconvenient for the user but it often interferes with an accurate reading of the maps.

Therefore, at least one attempt has been made to improve the known integrated key and detail map booklets. Specifically, Anderson U.S. Pat. No. 2,889,638 discloses a book containing at least one key map and a plurality of detail maps which pivot about the key map to permit simultaneous viewing of the key and detail maps. The key map is located on a single page or complementary page parts which fold along a fold line when the book is closed and includes letter indicia along its periphery. Likewise, the detail maps include number indicia along their periphery which are used in conjunction with the letter indicia on the key map to facilitate finding specific streets, towns, or other sites on the detail maps. This requires, in part, pivoting the detail map into a specific position relative to the key map. Thus, while the Anderson book may provide a means for simultaneously viewing a key map and detail maps, there are other problems associated with this booklet, as discussed below.

First, use of the Anderson book involves maneuvering a selected detail map 180 degrees about a pivot to properly position it for concurrent viewing with the key map. During this maneuvering process, the Anderson book must be unfolded to expose the key map for viewing with the detail map. Not only is the maneuvering process of the detail map awkward, but the resulting configuration of the Anderson book is cumbersome and makes viewing of the maps difficult in a restricted space, such as the interior of an automobile.

Second, locating a specific street or other site on the detail map of the Anderson book requires that the detail map be pivoted about, and positioned relative to, the key map. Moreover, locating the particular detail map that displays the cartographic indicia of an adjacent section on the key map requires viewing the key map. This is because individual key maps do not include reference notations to adjoining detail maps. Consequently, the detail map must be pivoted about and viewed simultaneously with the key map for maintaining the orientation between the two maps and the surrounding regions. Both of these situations are less than satisfactory.

Accordingly, an object of the present invention is to provide an improved bound volume of cartographic material that includes a key map which may be used in juxtaposition with detail maps.

It is another object of the present invention to provide an improved bound volume of cartographic material that is not cumbersome to use.

It is another object of the present invention to provide an improved bound volume of cartographic material wherein specific sites may be found directly on the detail maps.

It is another object of the present invention to provide an improved bound volume of cartographic material wherein each of the detail maps includes reference notations to adjoining detail maps which display cartographic indicia of an adjacent grid section.

It is another object of the present invention to provide an improved bound volume of cartographic material which may be viewed in small, restricted spaces.

It is yet another object of the present invention to provide an improved bound volume of cartographic material which is inexpensive to manufacture.

SUMMARY OF THE INVENTION

The present invention, in a preferred embodiment, accomplishes the foregoing objects by providing a bound volume of cartographic material that comprises, in part, a large plurality of rectangular leaves, a binding mechanism, and a cover. The binding mechanism binds the leaves and the cover together into a single volume.

The cover includes a first panel and a second panel. The first panel includes a first and a second side edge and is the height and width of the leaves. A detailed street map of a central city is located on the inner surface of the first panel. The second panel is hingedly connected to the first panel and is proportioned to fold over the first panel and to fold out and lie adjacent the second side edge of the first panel. The second panel, when folded out, displays first, small scale cartographic indicia and key grid indicia. The key grid indicia includes multiple grid sections which overlie the first cartographic indicia. The second panel, when folded over, displays a map legend and instructions for using the bound cartographic material.

Each of the leaves define second, large scale cartographic indicia and bear a key grid indicium. The cartographic indicia on an individual leaf corresponds to the cartographic indicia in one of the grid sections. Likewise, the key grid indicium on the individual leaf corresponds to the key grid indicia for one of the grid sections. Thus, the leaves and the second panel may be used in juxtaposition to view, coordinate, and compare the large scale and the small scale cartographic indicia in a side-by-side relationship.

In addition to the foregoing, each of the leaves includes a letter-number grid adjacent its periphery which provides coordinates for locating a specific street name in the large scale indicia. Furthermore, each of the leaves includes at least one reference notation to adjoining leaves, with the reference notation being located along a non-bound edge and referring to a map page number on another leaf which displays the cartographic indicia of an adjacent grid section. Moreover, at least one of the leaves preferably includes an index which alphabetically lists street names that are followed by an index reference that includes a specific map page number and letter-number grid coordinate.

The above, as well as other objects, features, and advantages of the invention, will become apparent from the following detailed description of the preferred embodiment, reference being made to the accompanying drawings.

DETAILED DESCRIPTION

Figure 1:
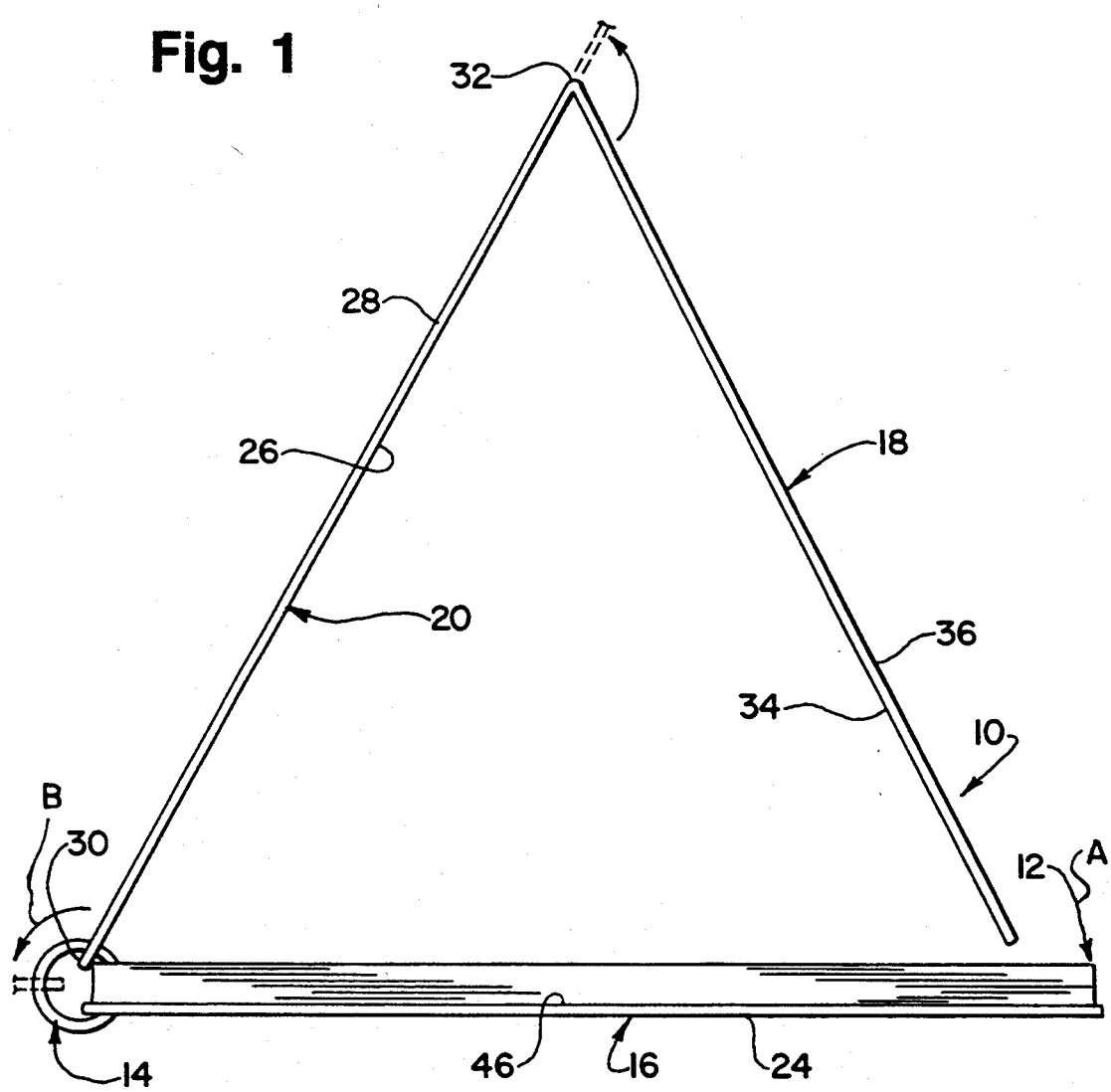
FIG. 1 is an end view of a bound volume of cartographic indicia material, illustrating the unfolding of the hinged front cover.
Figure 2:
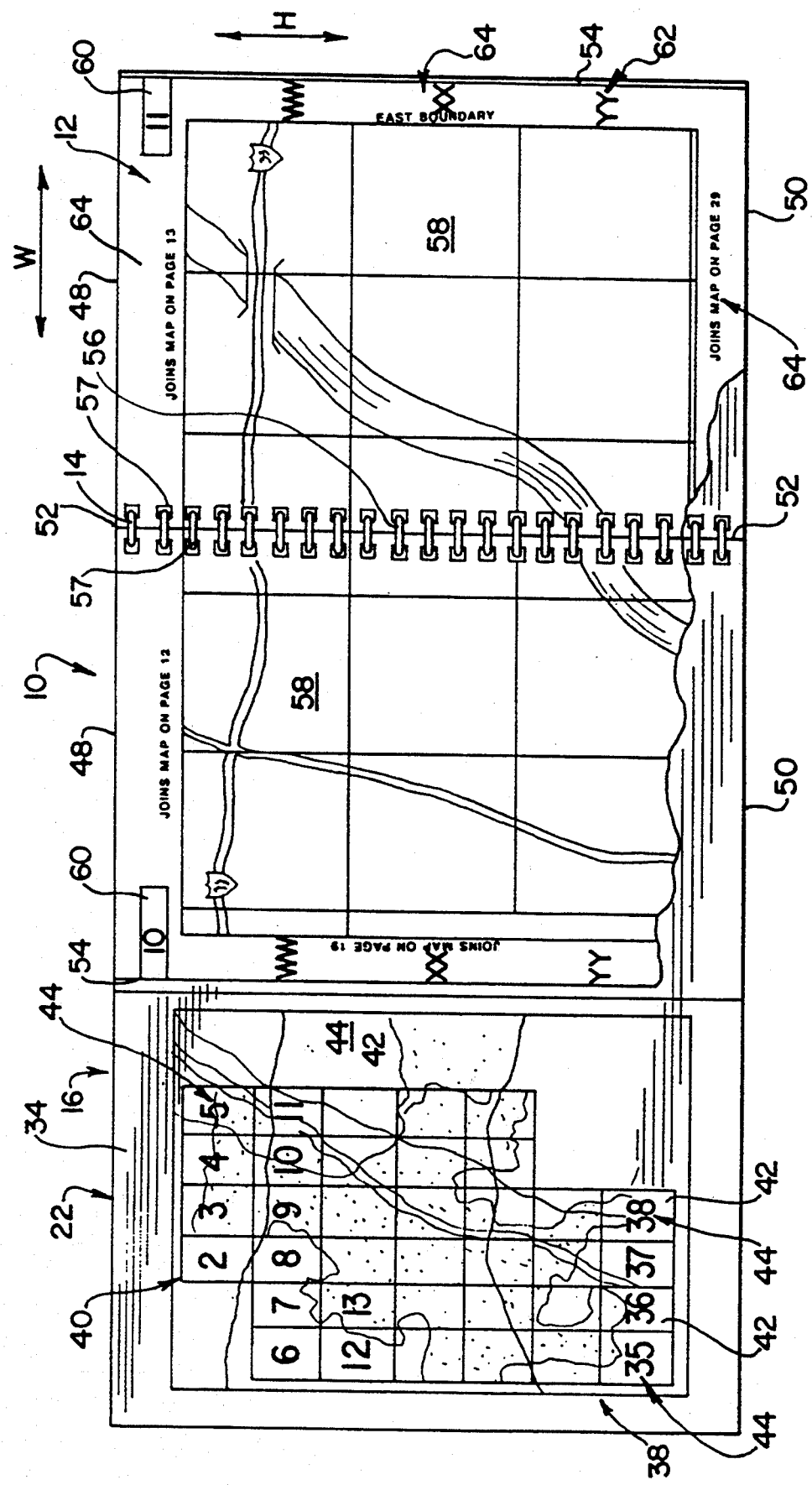
FIG. 2 is a plan view of the bound volume of FIG. 1, illustrating its appearance in an unfolded position and illustrating the side-by-side relationship of the large and small scale cartographic indicia.
Figure 3:
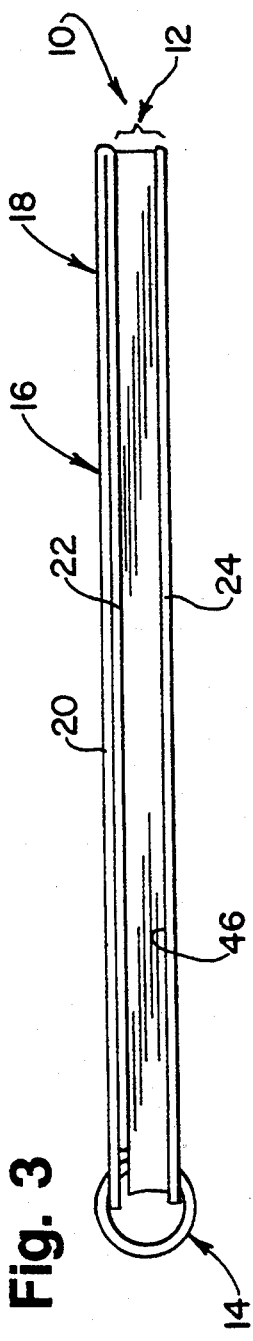
FIG. 3 is an end view of the bound volume of FIG. 1, illustrating its appearance in a folded position.

Generally referring to FIGS. 1–3, the invention provides a bound volume of cartographic material 10, comprising, in part, a large plurality of rectangular leaves 12, a binding means or mechanism 14, and a cover 16. A portion of the cover includes small scale cartographic indicia and key grid indicia, whereas the leaves define corresponding large scale cartographic indicia and bear a key grid indicium. The cover and the leaves may be used in juxtaposition to view, coordinate, and compare the large scale and the small scale cartographic indicia in a side-by-side relationship.

Cover 16 has a front cover portion 18 that includes a formed together front or first panel 20 and a second panel 22, and a back cover portion 24 (FIGS. 1 and 3). The front cover and back cover portion may be formed together or may be separate elements. First panel 20 includes an inner surface 26, an outer surface 28, and a first and second side edges, 30 and 32, respectively. First panel 20 is of a height and width substantially the same as leaves 12. Likewise, second panel 22 includes an inner surface 34, an outer surface 36, and is of a height and width comparable to that of first panel 20.

First panel 20 is bound by binding mechanism 14 along first side edge 30, and may include a detailed street map (not shown) of a central city on inner surface 26. The street map may include street names, points of interest, and public institutions and facilities of interest. A letter-number grid is located along the periphery of the street map for providing coordinates for locating a specific street.

Second panel 22 is hingedly connected, as along a fold line, at second side edge 32 of first panel 20 and is proportioned to fold over inner surface 26 of first panel 20 (FIG. 3) and to fold out and lie adjacent second side edge 32 (FIGS. 1 and 2). Second panel 22, when folded out, displays first, small scale cartographic indicia 38 and key grid indicia 40 (FIG. 2). Small scale cartographic indicia 38 represents a large geographic area and typically includes principal cities and towns, major highways, route numbers, parks, monuments, bodies of water, etc. in the area. In addition, key grid indicia 40 includes multiple grid sections 42 that overlie first cartographic indicia 38 and encompasses sequentially arranged identifiers or numbers 44 that are centrally located within the multiple grid sections 42. Sequential numbers 44 preferably extend across the width and from top to bottom of multiple grid sections 42.

Second panel 22 of cover 16, when folded over to a closed position, displays a map legend and instructions (not shown) for using the bound cartographic material. Likewise, back cover portion 24 of cover 16 includes an inner surface 46 that may display a zip code map (not shown).

Leaves 12 include a top edge 48, a bottom edge 50, and side edges 52, 54. Leaves 12 are bound by binding mechanism 14 along one of side edges 52 or 54. As shown in FIG. 2, leaves 12 are bound by a unitary element such as a continuous wire element 56, such as a wire-O binder along side edges 52. Portions of the wire element pass through slots 57 in the leaves and cover portions to hold them together. Each of the leaves 12 further is of a height H and a width W that is approximately the same as the height and width of the first cover panel 20.

Each of leaves 12 defines second, large scale cartographic indicia 58 and bears a key grid indicium 60 (FIG. 2). Large cartographic indicia 58 on an individual leaf corresponds to small scale cartographic indicia 38 in one of multiple grid sections 42 and includes a detailed showing of the roadways, geography, and other data of that particular grid section. Similarly, key grid indicium 60 on each individual leaf corresponds to key grid indicia 40 for one of the multiple grid sections 42. Specifically, each key grid indicium corresponds to one of the sequential numbers in multiple grid sections 42 and is preferably located adjacent top edge 48 and along the non-bound side edge of leaves 12.

Each of leaves 12 further includes a letter-number grid 62 adjacent its periphery which provides coordinates for locating a specific street name in the second large scale cartographic indicia. In addition, each of leaves 12 includes at least one reference notation 64 to adjoining leaves. Reference notation 64 is located along a non-bound edge and refers to a map page number or key grid indicium 60 on another leaf which displays the cartographic indicia of an adjacent grid section. Occasionally, a boundary reference is located in place of reference notation 64 on one of the non-bound edges of leaves 12. Each leaf preferably includes three reference notations (FIG. 2).

In the preferred embodiment, at least one of leaves 12 includes an index (not shown) which alphabetically lists street names. An index reference preferably follows each street name and includes a specific map page number and letter-number grid coordinate.

A mileage scale (not shown) is preferably located on second panel 22 of cover 16 and on alternating leaves 12.

In use, the motorist or other user opens front cover portion 18, to expose the small scale indicia 38 and key grid indicia 40 on second panel 22, as indicated by arrows A and B in FIG. 1. Next, the user locates a desired section of small scale indicia 38 on second panel 22 and determines which of multiple grid sections 42 overlies the desired section. For example, if the user desires to travel into the northeast portion of the Sandia Indian Reservation, the user first locates that area on second panel 22 and then determines that multiple grid section 21 overlies the area (FIG. 2). The user then turns to the leaf with a key grid indicium 60 which corresponds to sequential number 44 of the overlying grid section. Thus, in the example above, the user would turn to the leaf with a key grid indicium of 21 adjacent top edge 48. The corresponding leaf (leaf 21 in the example) displays large scale cartographic indicia 58 which corresponds to the small cartographic indicia 38 in the previously selected grid section. Thus, the corresponding leaf (leaf 21) may then be used in juxtaposition with second panel 22 of cover 16 to view, coordinate, and compare the large scale and the small scale cartographic indicia in a side-by-side relationship.

If the user further desires to view an adjoining area of the small scale indicia on a particular leaf, then the user may refer to the reference notations 64 along the non-bound edges of the leaf. Thus, in the above example, the user would turn to page 13 or key grid indicium 13 to view the area adjacent to and north of the small scale indicia on the leaf (FIG. 2). The same method is used for viewing the remaining adjoining areas. Occasionally, however, one of the adjoining areas of a particular leaf is an outer limit or boundary of the large scale indicia. In such a case, the reference notation will designate such a boundary. Thus, the adjoining area east of small scale indicia in leaf 21 is delineated "East Boundary" (FIG. 2). In addition, the adjoining area of a leaf along the bounded edge is always the adjacent or complementary page. Accordingly, the adjoining area west of the small scale indicia on leaf 21 of FIG. 2 is found on complementary page 20.

The material from which cover 16 is constructed is preferably paper but may alternatively be coated paper, plastic or virtually any lightweight sheet material. Leaves 12 are preferably made from paper. In a specific form, bound volume 10 may be about 10½"×8". It should be understood that the dimensions of the bound volume of cartographic material may vary according to need. Further, although a wire-o wire binding means has been described, other binders such as spiral binders or plastic binders of various types may be used as well.

Figure 4:
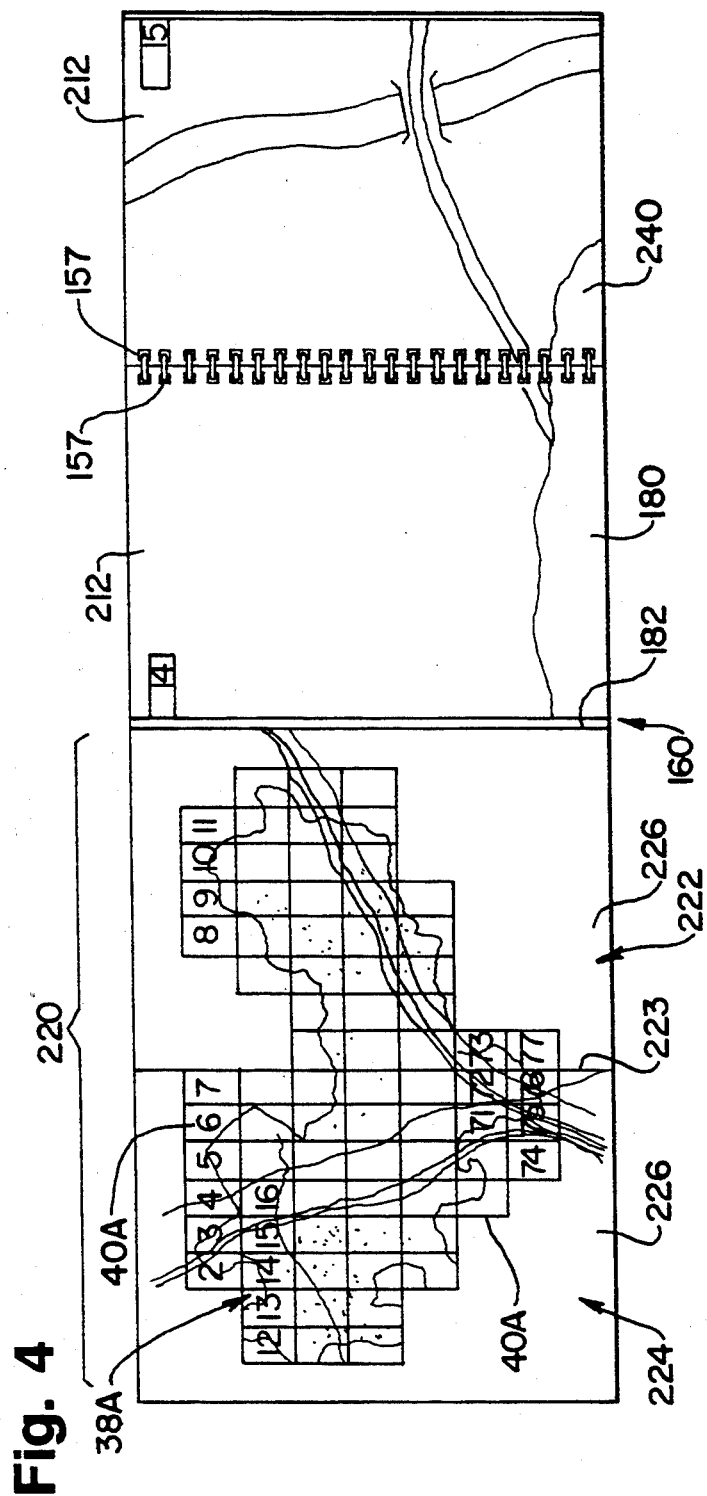
FIG. 4 is a plan view of a cover of a further embodiment of the present invention.

As was pointed out above, the front cover and back cover portion may be separate elements or may be formed together. Thus, as illustrated by FIG. 4, a cover 160 may be used which may include a front cover portion 180 and a back cover portion 240 joined at their inner edges. The cover portions 180 and 240, like cover portions 16 and 18, define slots 157 adjacent their adjacent side edges for binding with a wire-O wire binder element. The adjacent side edge portions merge in an associated spine between the sets of slots 157.

Additionally, the bound volume embodiment of FIG. 4, which secures leaves 212, like leaves 12, in the same manner as shown in FIGS. 1-3, has a second panel 220 which is hingedly connected to front cover portion 180, as along a fold line 182, at the outer side edge 182 of the cover portion 180. In this embodiment the second panel 60 includes a pair of panel sections 222, 224, which are hingedly connected, as along fold line 223, along their zone of connection. It will be apparent that section 224 is foldable relative to section 222, and that when folded against each other, they can fold relative to and over front cover portion 180 about fold line 182. They are dimensioned and proportioned so they can fold without interference.

The inner surface 226 of second panel 220 is provided with and displays indicia, including small scale cartographic indicia 38A and key grid indicia 40A like those elements displayed on inner surface 34. Here, however, those indicia may be spread across inner surface portions of each of the panel elements 222, 224. This may be useful where the area to be displayed (and for which corresponding leaves are provided) is so great that a surface greater in size than that of a single leaf cannot usefully be displayed on a panel of single leaf width.

It will also be apparent that although the indicia bearing cover panel has been described as being formed with and as being foldable relative to, the front cover, it could also be formed with the back cover and used in the same manner.

It should be understood that the claims are intended to cover that possibility, as well as the possibility that the flap which folds under the cover panel may be a multi-section flap as described in connection with FIG. 4.

Therefore, it should be recognized that, while the invention has been described in relation to a preferred embodiment thereof, those skilled in the art may develop a wide variation of structural details without departing from the principles of the invention. Accordingly, the appended claims are to be construed to cover all equivalents falling within the scope and spirit of the invention.

We claim:

1. A bound volume of cartographic material comprising:
    a plurality of rectangular leaves of a first height and width, each of said leaves having top and bottom edges and side edges;
    a binding means;
    each of said leaves being bound by said binding means along one of said side edges;
    a cover comprising a first cover panel and a second panel, said first cover panel having first side and second side edges and being of substantially the same height and width as said leaves, said first cover panel being bound by said binding means along said first side edge, and said second panel being hingedly connected to the second side edge of said first cover panel, said second panel being proportioned to fold under said first cover panel and to fold out and lie adjacent said second side edge of said first cover panel;
    said second panel, when folded out, displaying first, small scale continuous cartographic indicia and key grid indicia, said key grid indicia comprising multiple grid sections overlying and superimposed against said first cartographic indicia;
    each of said leaves defining and bearing second, large scale cartographic indicia and bearing a key grid indicium, the large scale cartographic indicia on an individual leaf corresponding to the small scale cartographic indicia in one of said grid sections on said second panel, and the key grid indicium on an individual leaf corresponding to the key grid indicia for one of said grid sections;
    whereby said second panel and said leaves may be used in juxtaposition to locate, view, coordinate, and compare the large scale and the small scale cartographic indicia in a side-by-side relationship.

2. The bound volume of claim 1 wherein each of said leaves includes a letter-number grid adjacent its periphery which provides coordinates for locating a specific street name in the second cartographic indicia.

3. The bound volume of claim 1 wherein said multiple grid sections of said key grid indicia encompass a plurality of sequentially arranged numbers that are centrally located within said multiple grid sections.

4. The bound volume of claim 1, and wherein said second panel comprises two sections which are foldable relative to each other, said two sections together displaying said small scale cartographic indicia and key grid indicia, said second panel, when said two sections are folded against each other, being proportioned to fold over said first cover panel.

5. The bound volume of claim 1 wherein said binding means comprises a wire element.

6. The bound volume of claim 5, and wherein said wire element is a metal wire-O element which is bound through slots in said cover adjacent said second side edge.

7. The bound volume of claim 1 wherein each of said leaves includes at least one reference notation to adjoining leaves, said reference notation being located along a non-bound edge and referring to a map page number on another leaf, said other leaf displaying the cartographic indicia of an adjacent grid section.

8. The bound volume of claim 7 wherein a boundary reference is located on one of the non-bound edges.

9. The bound volume of claim 1 wherein at least one of said leaves includes an index which alphabetically lists street names.

10. The bound volume of claim 9 wherein each of said street names is followed by an index reference which comprises a specific map page number and letter-number grid coordinate.

11. The bound volume of claim 1 wherein said cover further comprises a front cover panel and a back cover panel each having an inner surface and an outer surface.

12. The bound volume of claim 11, and wherein said back cover panel is formed with said front cover panel along the second side edge thereof and said back cover panel and said front cover panel are bound by said binding means adjacent said second side edge.

13. The bound volume of claim 12, and wherein said wire element is a metal wire-O element which is bound through slots in said cover adjacent said second side edge.

* * * * *